(12) United States Patent
Shintani et al.

(10) Patent No.: US 9,049,359 B2
(45) Date of Patent: *Jun. 2, 2015

(54) CAMERA BODY

(71) Applicant: Panasonic Corporation, Osaka (JP)

(72) Inventors: Dai Shintani, Osaka (JP); Masato Murayama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/305,019

(22) Filed: Jun. 16, 2014

(65) Prior Publication Data

US 2014/0293125 A1 Oct. 2, 2014

Related U.S. Application Data

(63) Continuation of application No. 13/062,361, filed as application No. PCT/JP2009/004040 on Aug. 21, 2009, now Pat. No. 8,786,770.

(30) Foreign Application Priority Data

Sep. 10, 2008 (JP) ................................ 2008-231739

(51) Int. Cl.
*H04N 5/225* (2006.01)
*G03B 9/36* (2006.01)
(Continued)

(52) U.S. Cl.
CPC ................ *H04N 5/2254* (2013.01); *G03B 9/36* (2013.01); *G03B 17/14* (2013.01); *H04N 5/232* (2013.01); *H04N 2101/00* (2013.01)

(58) Field of Classification Search
CPC ... H04N 5/2253; H04N 5/2254; G03B 19/12; G03B 9/08; G03B 17/14

USPC .............. 348/240.3, 335, 360, 362, 373, 374; 396/354, 355, 357, 449, 452, 475, 529, 396/532

See application file for complete search history.

(56) References Cited

U.S. PATENT DOCUMENTS 4,688,916 A 8/1987 Dobashi et al.
5,889,555 A 3/1999 Kawase et al. ................ 348/336
(Continued)

FOREIGN PATENT DOCUMENTS

JP 60-79341 5/1985
JP 61-193135 8/1986
(Continued)

OTHER PUBLICATIONS

International Search Report of PCT Application No. PCT/JP2009/004040 dated Oct. 27, 2009.
(Continued)

*Primary Examiner* — Lin Ye
*Assistant Examiner* — Chriss Yoder, III
(74) *Attorney, Agent, or Firm* — Panasonic Patent Center

(57) ABSTRACT

A camera body, to which a lens unit configured to form an optical image of a subject is attachable, comprises a body mount to which the lens unit is attachable, an imaging element configured to convert the optical image of the subject into an electrical signal, and a shutter unit. The shutter unit is disposed between the body mount and the imaging element and provided so that an optical path can be blocked between the lens unit and the imaging element. The shutter unit is configured to be in an open state while the lens unit is removed from the body mount.

13 Claims, 11 Drawing Sheets

(51) Int. Cl.
  *G03B 17/14* (2006.01)
  *H04N 5/232* (2006.01)
  *H04N 101/00* (2006.01)

(56) References Cited

U.S. PATENT DOCUMENTS

| | | | |
|---|---|---|---|
| 6,390,691 | B1 | 5/2002 | Nakagawa |
| 6,774,946 | B1 | 8/2004 | Misawa et al. ............... 348/372 |
| 7,567,290 | B2 | 7/2009 | Tokiwa et al. ............... 348/360 |
| 7,972,069 | B2 | 7/2011 | Shintani ..................... 396/452 |
| 2001/0038418 | A1 | 11/2001 | Suda et al. .................. 348/347 |
| 2004/0252991 | A1 | 12/2004 | Kawai et al. ................. 396/529 |
| 2005/0012845 | A1 | 1/2005 | Kouno ........................ 348/342 |
| 2005/0110897 | A1 | 5/2005 | Wakabayashi |
| 2005/0195315 | A1 | 9/2005 | Naganuma .................... 348/367 |
| 2006/0062570 | A1 | 3/2006 | Kikuchi et al. .............. 396/439 |
| 2007/0104480 | A1 | 5/2007 | Shiozaki et al. |
| 2007/0280673 | A1 | 12/2007 | Mikami et al. |
| 2008/0151093 | A1* | 6/2008 | Wakikawa et al. ....... 348/333.01 |
| 2009/0154915 | A1 | 6/2009 | Hasuda ....................... 396/535 |

FOREIGN PATENT DOCUMENTS

| | | |
|---|---|---|
| JP | 63-127677 | 5/1988 |
| JP | 10-221740 | 8/1998 |
| JP | 2000-50132 | 2/2000 |
| JP | 2000-330193 | 11/2000 |
| JP | 2000-338543 | 12/2000 |
| JP | 2003-23560 | 1/2003 |
| JP | 2004-282686 | 10/2004 |
| JP | 2005-156842 | 6/2005 |
| JP | 2005-250209 | 9/2005 |
| JP | 2006-98909 | 4/2006 |
| JP | 2006-313250 | 11/2006 |
| JP | 2007-127836 | 5/2007 |
| JP | 2007-312197 | 11/2007 |
| JP | 2007-318644 | 12/2007 |
| JP | 2007-324794 | 12/2007 |

OTHER PUBLICATIONS

European Search Report, Application No. EP09 81 2838.2-2209, dated Oct. 4, 2011.

\* cited by examiner

CAMERA BODY

This Application is a Continuation of and claims benefit from U.S. patent application Ser. No. 13/062,361 that was filed on Mar. 4, 2011 and that claims priority under 35 U.S.C. §119(a) to Japanese Patent Application No. 2008-231739, filed in Japan on Sep. 10, 2008, the entire contents of which are hereby incorporated herein by reference.

TECHNICAL FIELD

The technology disclosed herein relates to a camera body which allows a lens unit to be mounted, and to an imaging device equipped with this camera body.

BACKGROUND ART

An interchangeable lens type of digital camera is a known imaging device (see Patent Literature 1, for example. The camera discussed in Patent Literature 1 has a lens unit and a camera body. This camera body has a CCD (charge coupled device) image sensor or other such imaging element, and a mirror box disposed between the lens unit and the imaging element. The mirror box apparatus guides light that has passed through the lens unit to either a CCD image sensor or a prism. Light guided to the prism is guided by that prism to a viewfinder.

CITATION LIST

Patent Literature

Patent Literature 1: Japanese Laid-Open Patent Application 2007-127836

SUMMARY

With a conventional interchangeable lens type of digital camera, however, because a mirror box apparatus is provided, it is difficult to reduce the size of the camera body.

In view of this, the inventors of the present application developed a novel interchangeable lens type of digital camera that has no mirror box apparatus. Eliminating the mirror box apparatus makes it possible to reduce the size of the camera body.

Nevertheless, the inventors discovered that a new problem is encountered when no mirror box apparatus is installed in the camera body. More specifically, there is the risk that the lens unit will move into the body mount in a tilted state in the mounting of the lens unit, but if no mirror box apparatus is installed in the camera body, there is the danger that the shutter unit and other such parts disposed near the body mount will be damaged.

The technology disclosed herein allows a camera body and imaging device that are compact and highly reliable to be provided.

A camera body disclosed herein allows the mounting of a lens unit configured to form an optical image of a subject. This camera body comprises a body mount, an imaging element, a shutter unit, and a shutter controller. The body mount allows the lens unit to be mounted. The imaging element is configured to convert the optical image of the subject into an electrical signal. The shutter unit is disposed between the body mount and the imaging element and is provided so that the optical path can be blocked between the lens unit and the imaging element. The shutter controller is configured to control the shutter unit before the supply of power is halted, so as to maintain the shutter unit in an open state while the supply of power is halted.

With this camera body, since the shutter unit is controlled by the shutter controller so as to maintain the shutter unit in an open state while the supply of power is halted, the open state of the shutter unit 190 can be maintained while the supply of power is halted, and damage to the shutter unit 190 can be prevented. Consequently, even though no mirror box apparatus is installed, damage to the shutter unit can be prevented, and reliability can be preserved while reducing the size. The same effect is also obtained with an imaging device comprising this camera body and a lens unit.

The camera body and imaging device here may be devices capable of capturing only still pictures, or devices capable of capturing only moving pictures, or devices capable of capturing both still pictures and moving pictures.

DESCRIPTION OF EMBODIMENTS

First Embodiment

1: Configuration 1-1: Summary of Digital Camera

Figure 1:
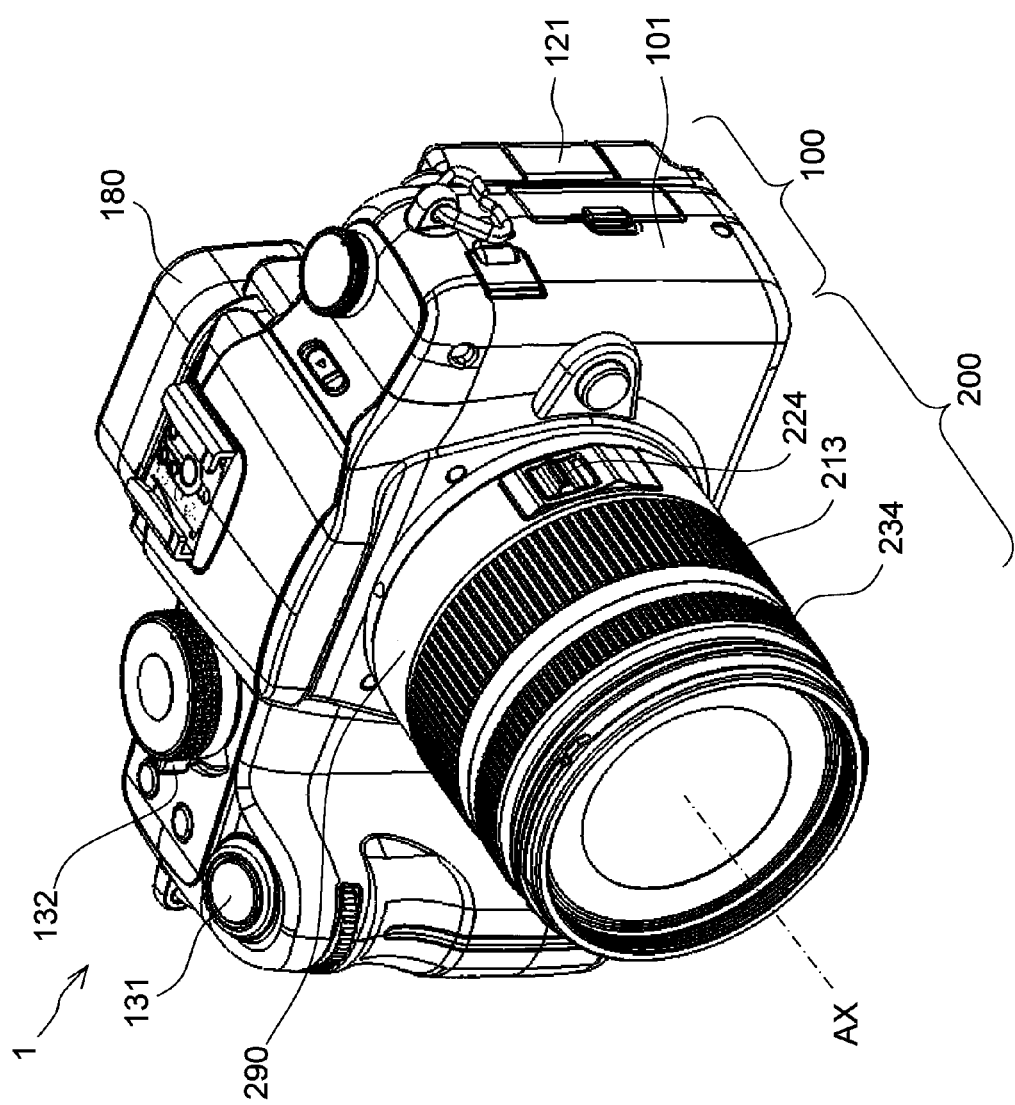
FIG. 1 is an oblique view of a digital camera 1.
Figure 2:
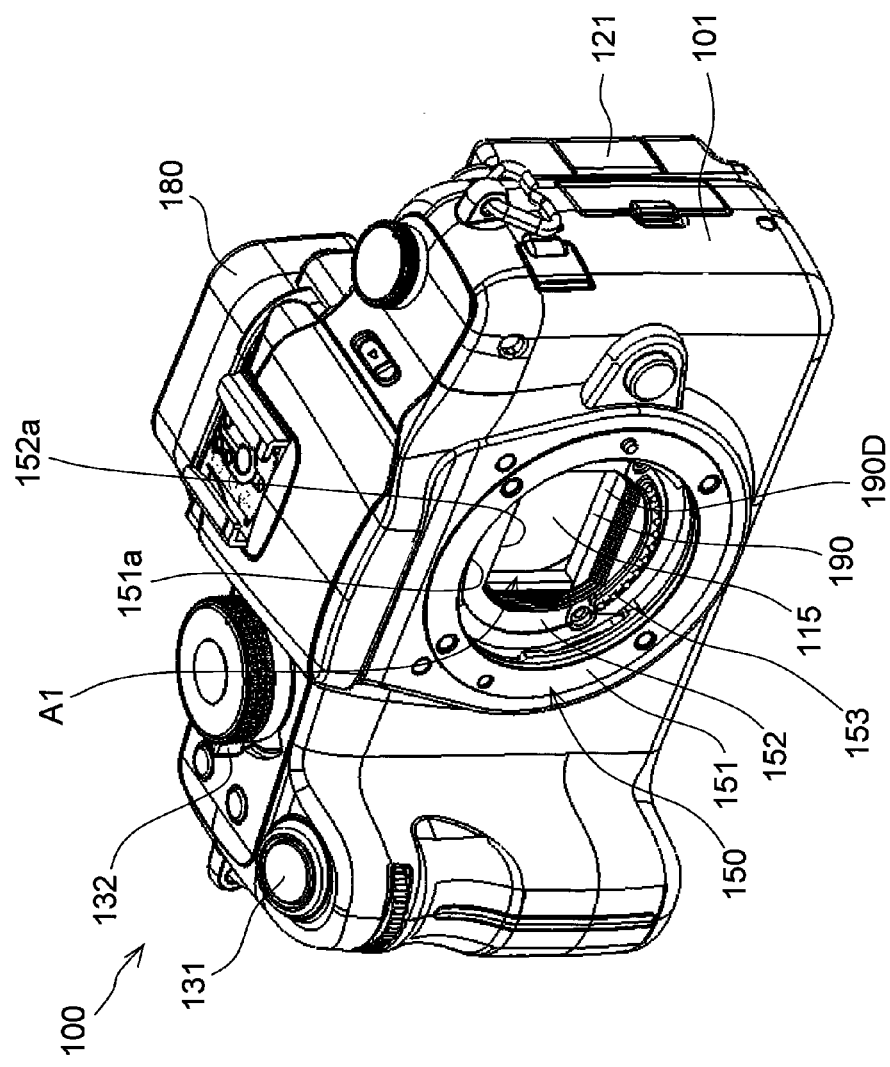
FIG. 2 is an oblique view of a camera body 100.
Figure 3:
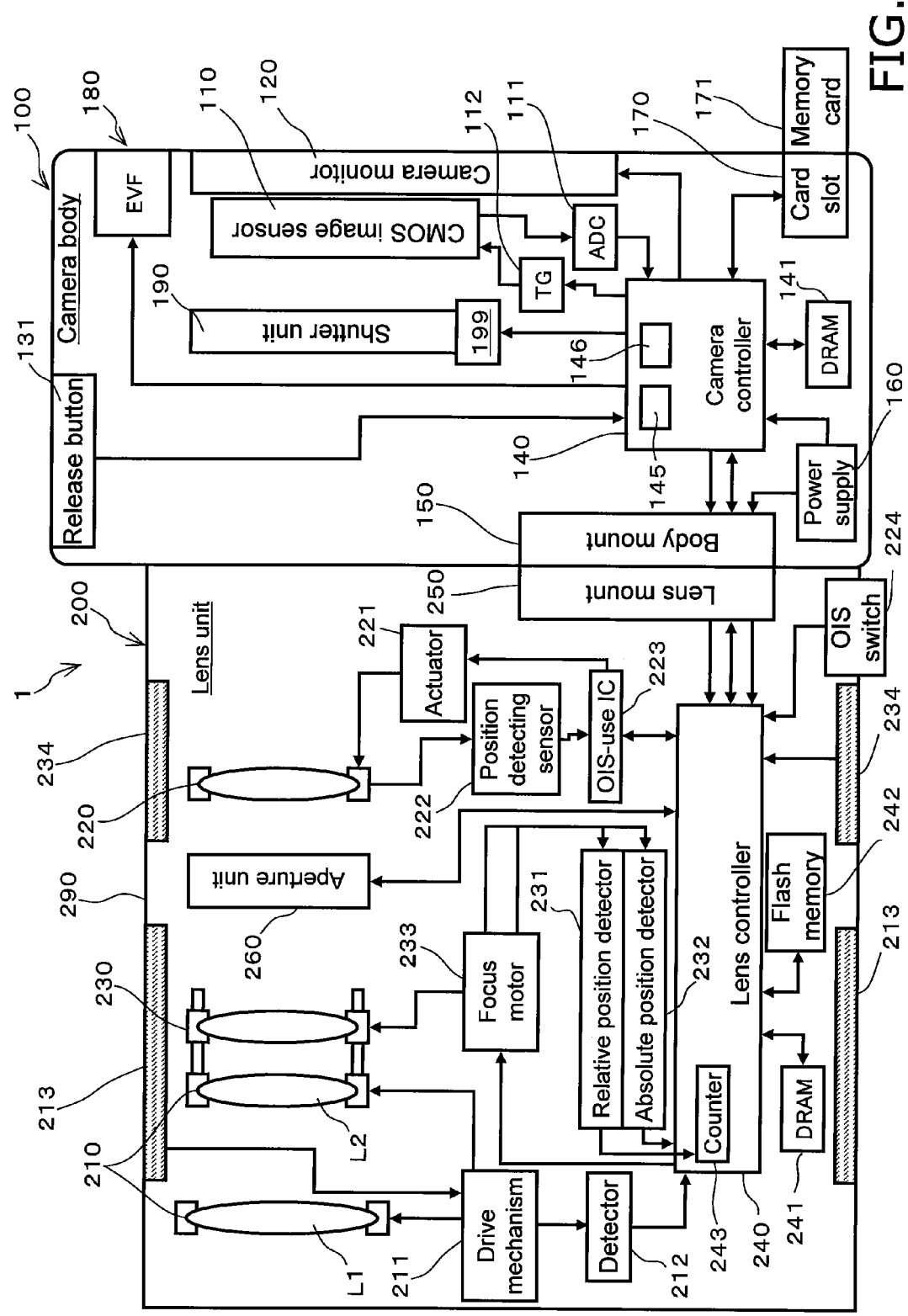
FIG. 3 is a block diagram of the digital camera 1.

As shown in FIGS. 1 to 3, the digital camera 1 pertaining to a first embodiment comprises a camera body 100 and a lens unit 200 that can be mounted to the camera body 100.

Unlike a conventional single lens reflex camera, the camera body 100 has no mirror box apparatus, so compared to a conventional single lens reflex camera, the flange back is shorter, and making the flange back shorter allows the camera body 100 to be more compact. Furthermore, shortening the flange back affords greater latitude in designing the optical system, so the lens unit 200 can be made more compact.

For the sake of convenience in the following description, the subject side of the digital camera 1 will be referred to as "front," the image plane side as "rear" or "back," the vertical upper side in the normal orientation (hereinafter also referred to as landscape orientation) of the digital camera 1 as "top," and the vertical lower side as "bottom."

1-2: Configuration of Camera Body

Figure 4:
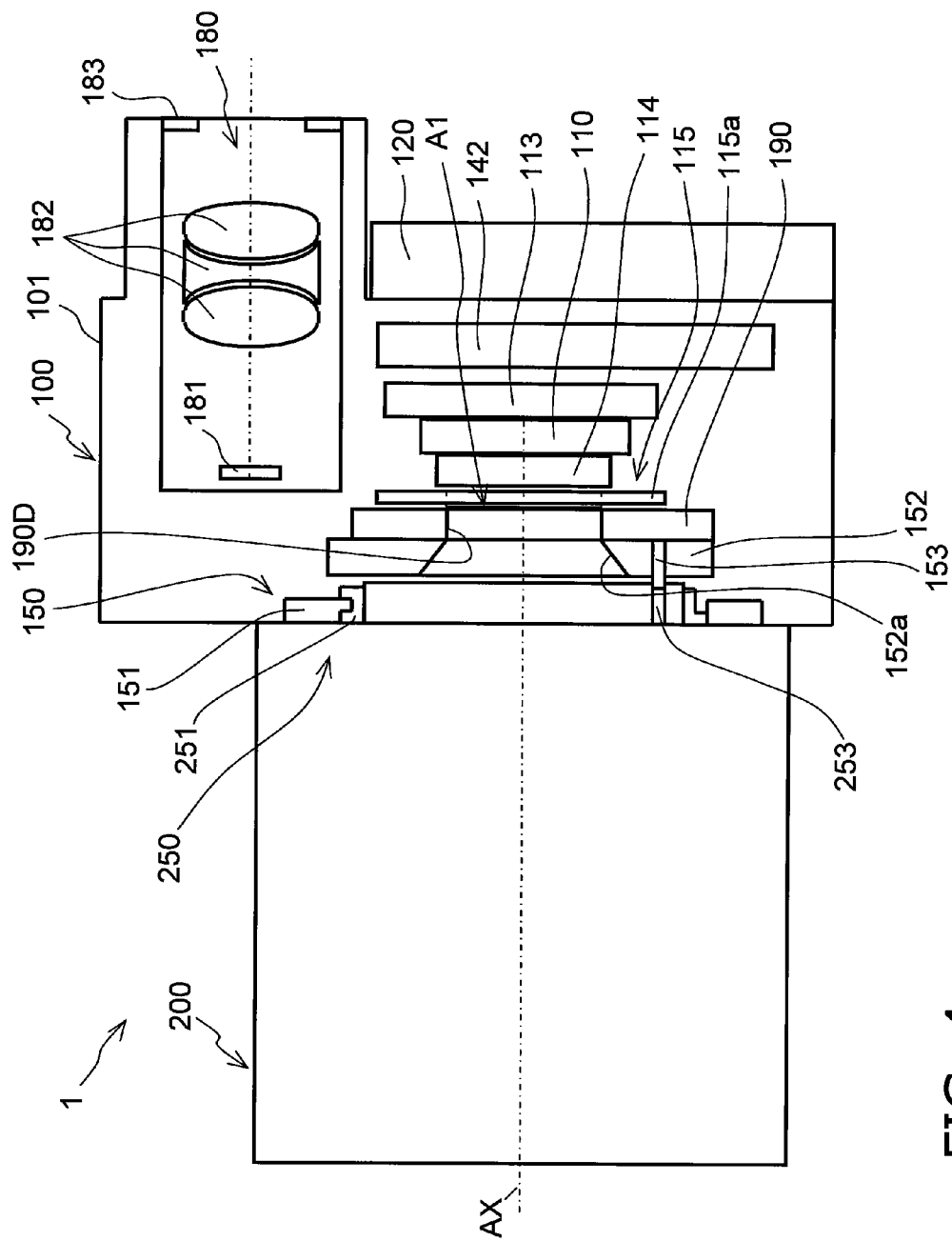
FIG. 4 is a simplified cross section of the digital camera 1.

As shown in FIGS. 4 and 4, the camera body 100 mainly comprises a CMOS (complementary metal oxide semiconductor) image sensor 110, a CMOS circuit board 113, a camera monitor 120, a manipulation unit 130, a main circuit board 142 (including a camera controller 140), a body mount 150, a power supply 160, a card slot 170, an electronic viewfinder 180, a shutter unit 190, an optical low-pass filter 114, a diaphragm 115, and a housing member 101.

The body mount 150, the shutter unit 190, the diaphragm 115, the optical low-pass filter 114, the CMOS image sensor 110, the CMOS circuit board 113, the main circuit board 142, and the camera monitor 120 are disposed in that order, starting from the front, in the camera body 100.

The CMOS image sensor 110 produces image data about a subject by converting an optical image of the subject formed by the lens unit 200 (hereinafter also referred to as a subject image) into an electrical signal. The image data thus produced is digitized by an A/D converter 111 (discussed below) of the CMOS circuit board 113. The image data digitized by the A/D converter 111 is subjected to various image processing by the camera controller 140. The "various image processing" referred to here includes gamma correction processing, white balance correction processing, scratch correction processing, YC conversion processing, electronic zoom processing, and JPEG compression processing, for example.

The CMOS image sensor 110 operates on the basis of a timing signal produced by a timing generator 112. The CMOS image sensor 110 can acquire still picture data and moving picture data under control the CMOS circuit board 113. The acquired moving picture data is also used for displaying through images.

The term "through image" here refers to those images, out of the moving picture data, that are not recorded to a memory card 171. Through images are mainly moving pictures, and are displayed on the camera monitor 120 and the electronic viewfinder 180 (hereinafter also referred to as EVF) in order to determine the composition of moving or still pictures.

The CMOS image sensor 110 is an example of an imaging element that captures an optical image of a subject and converts it into an electrical image signal. The concept of imaging element here encompasses the CMOS image sensor 110 as well as CCD image sensors and other such opto-electric conversion elements.

The CMOS circuit board 113 is a circuit board that controls the drive of the CMOS image sensor 110. The CMOS circuit board 113 is a circuit board that subjects the image data outputted from the CMOS image sensor 110 to specific processing, and includes the timing generator 112 and the A/D converter 111, as shown in FIG. 3. The CMOS circuit board 113 is an example of an imaging element circuit board that controls the drive of the imaging element and subjects the image data outputted from the imaging element to specific processing such as A/D conversion.

The camera monitor 120 is a liquid crystal display, for example, and displays the display-use image data as an image. The display-use image data is produced by the camera controller 140 and is, for example, image data that has undergone image processing, or data for displaying the imaging conditions, control menus, and so forth of the digital camera 1. The camera monitor 120 is able to selectively display both still pictures and moving pictures.

Figure 5:
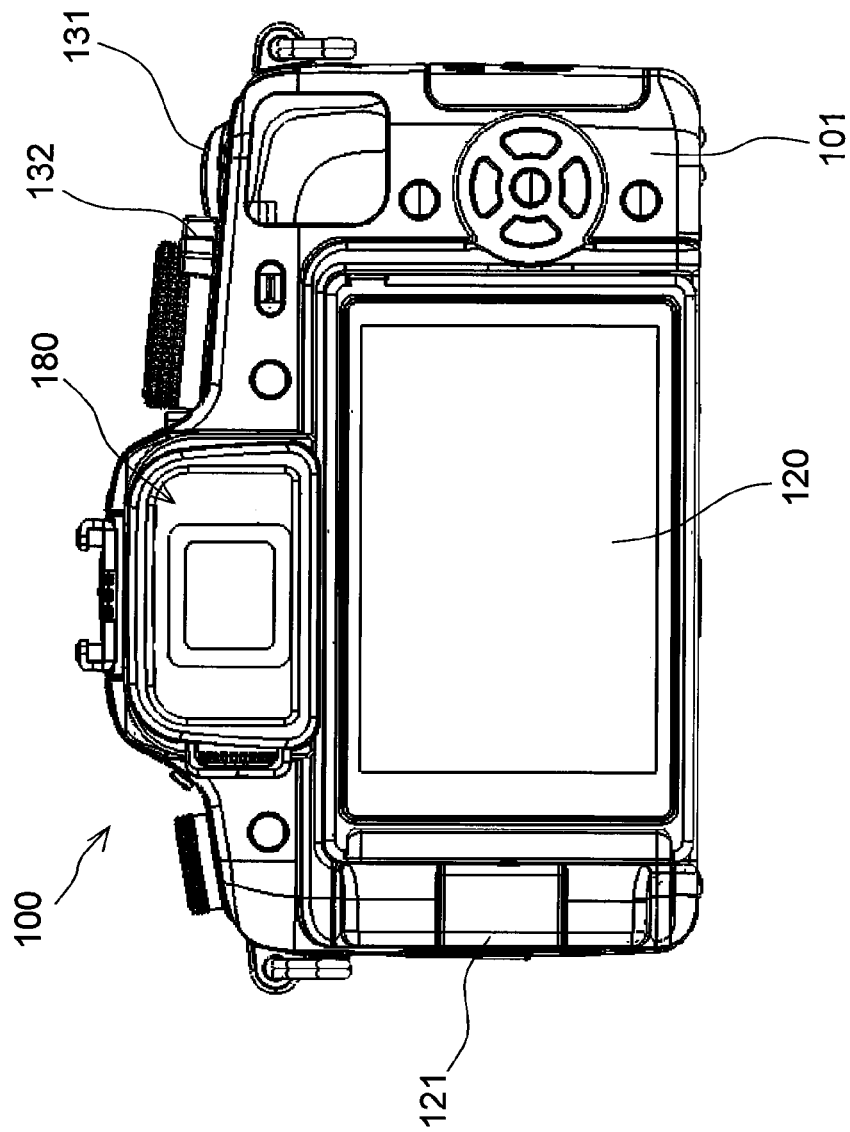
FIG. 5 is a rear view of the camera body 100.

As shown in FIG. 5, the camera monitor 120 is provided to the back face of the camera body 100. The camera monitor 120 may, however, be disposed anywhere on the camera body 100. The angle of the display screen of the camera monitor 120 with respect to the housing member 101 is variable. More specifically, as shown in FIGS. 1, 2, and 5, the camera body 100 has a hinge 121 that rotatably links the camera monitor 120 and the housing member 101. The hinge 121 is disposed on the left end of the camera body 100 as seen from the back face side in landscape orientation. The hinge 121 has a first rotational axis disposed parallel to the vertical direction in landscape orientation, and a second rotational axis disposed parallel to the horizontal plan in landscape orientation. The orientation of the camera monitor 120 with respect to the housing member 101 can be freely changed by rotating the camera monitor 120 around the first and second rotational axes.

The camera monitor 120 is an example of the display section provided to the camera body 100. The display section can also be an organic electroluminescence device, an inorganic electroluminescence device, a plasma display panel, or anything else that can display images. Also, the display section need not be provided to the back face of the camera body 100, may instead be on a side face, the top face, or somewhere else.

The electronic viewfinder 180 displays an image of the display-use image data produced by the camera controller 140. The EVF 180 is able to selectively display both still pictures and moving pictures. The EVF 180 and the camera monitor 120 may both display the same content, or may display different content, and are both controlled by the camera controller 140. The EVF 180 has an EVF-use liquid crystal monitor 181 that displays images and the like, an EVF-use optical system 182 that enlarges the display of the EVF-use liquid crystal monitor 181, and an eyepiece 183 against which the user positions an eye.

The EVF 180 is also an example of a display section. It differs from the camera monitor 120 in that the user puts an eye up to it and looks through it. The difference in terms of structure is that whereas the EVF 180 has the eyepiece 183, the camera monitor 120 does not have the eyepiece 183.

The proper display brightness is ensured with the EVF-use liquid crystal monitor 181 by providing a back light (not shown) in the case of a transmissive liquid crystal, and a front light (not shown) in the case of a reflective liquid crystal. The EVF-use liquid crystal monitor 181 is an example of an EVF-use monitor. This EVF-use monitor can be an organic electroluminescence device, an inorganic electroluminescence device, a plasma display panel, or anything else that can display images. In the case of a self-emitting device such as an organic electroluminescence device, there is no need for an illumination light source.

The manipulation unit 130 is operated by the user. More specifically, as shown in FIGS. 1 and 2, the manipulation unit 130 includes a release button 131 that the user presses to release the shutter, and a power switch 132, which is a rotary dial switch provided to the top face of the camera body 100. The release button 131 receives a shutter manipulation from users. The power switch 132 turns off the power at a first rotation position, and turns on the power at a second rotation position. The manipulation unit 130 may be in the form of buttons, levers, dials, a touch panel, or anything else that the user can operate. The power switch 132 is an example of a power supply manipulation section for switching the power supply on and off.

The camera controller 140 is disposed on the main circuit board 142, and controls the entire camera body 100, including its various components such as the CMOS image sensor 110. The camera controller 140 is electrically connected to the manipulation unit 130, and manipulation signals are inputted from the manipulation unit 130. The camera controller 140 uses a DRAM 141 as a working memory during control operations and image processing operations.

The camera controller 140 sends signals for controlling the lens unit 200 through the body mount 150 and a lens mount 250 to a lens controller 240, and indirectly controls the various components of the lens unit 200. Also, the camera controller 140 receives various kinds of signal from the lens controller 240 via the body mount 150 and the lens mount 250. Specifically, the camera controller 140 controls the entire digital camera 1. The camera controller 140 is an example of a body controller.

The camera controller 140 has a CPU (central processing unit), a ROM (read-only memory), and a RAM (random access memory), and can perform various functions when programs stored in the ROM are read into the CPU.

For example, as shown in FIG. 3, the camera controller 140 has a shutter controller 145 that controls the shutter unit 190 so as to maintain the shutter unit 190 in the open state while the supply of power is halted. The shutter controller 145 can thus maintain the shutter unit 190 in the open state while the supply of power from the power supply 160 is halted, by controlling the shutter unit 190.

Also, the shutter controller 145 controls the shutter unit 190 so as to keep the shutter unit 190 open in a state in which the lens unit 200 is being removed from the body mount 150, for example. Furthermore, the shutter controller 145 controls the shutter unit 190 so as to keep the shutter unit 190 open in reproduction mode.

As shown in FIG. 3, the camera controller 140 has a lens detector 146 that detects whether or not the lens unit 200 has been mounted to the camera body 100 (more precisely, to the body mount 150). More specifically, when the lens unit 200 is mounted to the camera body 100, signals are exchanged between the camera controller 140 and the lens controller 240. The lens detector 146 determines whether or not the lens unit 200 has been mounted on the basis of this exchange of signals. The shutter controller 145 controls the shutter unit 190 on the basis of the detection result of the lens detector 146. More specifically, the shutter controller 145 controls the shutter unit 190 so as to keep the shutter unit 190 open when the lens unit 200 is being removed from the body mount 150.

The shutter controller 145 can ascertain the rotational position of a cam member 190U by counting the drive signals of a shutter motor 199. This allows the shutter controller 145 to recognize the state of the shutter unit 190 (the state in either FIG. 6A, FIG. 6B, or FIG. 6C).

The card slot 170 allows the mounting of the memory card 171. The card slot 170 controls the memory card 171 on the basis of control from the camera controller 140. More specifically, the card slot 170 stores image data in the memory card 171, and outputs image data from the memory card 171. For example, the card slot 170 stores moving picture data in the memory card 171, and outputs moving picture data from the memory card 171.

The memory card 171 can store image data produced by image processing by the camera controller 140. For example, the memory card 171 can store uncompressed raw image files, compressed JPEG image files, or the like. Also, image data or image files stored ahead of time can be outputted from the memory card 171 via the card slot 170. The image data or image files outputted from the memory card 171 are subjected to image processing by the camera controller 140. For example, the camera controller 140 subjects the image data or image file acquired from the memory card 171 to expansion or the like, and produces display-use image data.

The memory card 171 is also able to store moving picture data produced by image processing by the camera controller 140. For example, the memory card 171 can store a moving picture file compressed according to H.264/AVC, which is a moving picture compression standard. The memory card 171 can also output, via the card slot 170, moving picture data or moving picture files stored internally ahead of time. The moving picture data or moving picture files outputted from the memory card 171 are subjected to image processing by the camera controller 140. For example, the camera controller 140 subjects the moving picture data or moving picture file acquired from the memory card 171 to expansion processing and produces display-use moving picture data.

The memory card 171 is also an example of a recording component that records the electrical signals produced by the imaging element. The recording component may be a memory that can be mounted to the camera body 100, such as the memory card 171, or may be a memory that is installed in the digital camera 1.

The power supply 160 supplies the various components of the digital camera 1 with electrical power. The power supply 160 may, for example, be a dry cell, or may be a rechargeable cell. The power supply 160 also may be an external power supply that supplies electrical power to the digital camera 1 through a power cord or the like.

The body mount 150 allows the mounting of the lens unit 200, and supports the lens unit 200 in a state in which the lens unit 200 is mounted. The body mount 150 can be mechanically and electrically connected to the lens mount 250 of the lens unit 200. Data and/or control signals can be exchanged between the camera body 100 and the lens unit 200 via the body mount 150 and the lens mount 250. More specifically, the body mount 150 and the lens mount 250 exchange data and/or control signals between the camera controller 140 and the lens controller 240. The body mount 150 supplies power received from the power supply 160 to the entire lens unit 200 via the lens mount 250.

More specifically, the body mount 150 includes a body mount ring 151 and a body mount contact support 152. The body mount ring 151 is an annular member that allows the fitting of the lens unit 200, and has a first opening 151a. A lens mount ring 251 of the lens unit 200 is either fitted or not fitted to the body mount ring 151 depending on the rotational positional relation with the lens mount ring 251 around the optical axis AX. Specifically, if the rotational positional relation between the body mount ring 151 and the lens mount ring 251 is a first state, the lens mount ring 251 is not fitted to the body mount ring 151, and the lens mount ring 251 is able to move (that is, can be removed) in a direction parallel to the optical axis AX (hereinafter also referred to as the optical axis direction) with respect to the body mount ring 151.

Also, when the lens mount ring 251 is inserted into the body mount ring 151 in the first state, and the lens mount ring 251 is rotated with respect to the body mount ring 151, the lens mount ring 251 mates with the body mount ring 151. If we let the rotational positional relation between the body mount ring 151 and the lens mount ring 251 at this point be a second state, then when the rotational positional relation is in the second state, the body mount ring 151 mechanically supports the lens unit 200. Since the body mount ring 151 mechanically supports the lens unit 200, the body mount ring 151 needs to have a certain amount of strength. Therefore, the body mount ring 151 is preferably made of metal.

The body mount contact support 152 is disposed between the body mount ring 151 and the shutter unit 190, and has a plurality of electrical contacts 153. In a state in which the lens unit 200 is mounted to the body mount 150, the plurality of electrical contacts 153 are in respective contact with a plurality of electrical contacts 253 had by the lens mount 250. In a state in which the electrical contacts 153 of the body mount 150 are in contact with the electrical contacts 253 of the lens mount 250, the body mount 150 and the lens mount 250 can be electrically connected. Also, the supply of power and the exchange of data and control signals between the camera body 100 and the lens unit 200 are carried out via the electrical contacts 153 of the body mount 150 are in contact with the electrical contacts 253 of the lens mount 250.

As shown in FIG. 2, the body mount contact support 152 has a second opening 152a. The inside diameter of the second opening 152a is smaller than the inside diameter of the first opening 151a of the body mount ring 151. The body mount contact support 152 is an example of a protective member that prevents the lens unit 200 from going into the camera body 100.

The shutter unit 190 is what is known as a focal plane shutter, and is disposed between the body mount 150 and the CMOS image sensor 110. The shutter unit 190 has a shutter mechanism 198 that is provided so as to be capable of blocking the optical path between the lens unit 200 and the CMOS image sensor 110 and that is able to enter an open state and a closed state, and a shutter motor 199 that drives the shutter mechanism 198. The shutter mechanism 198 mainly has a rear curtain 190A, a front curtain 190B, and a shutter support frame 190C having an opening 190D. The shutter motor 199 is a stepping motor, for example, and is controlled by the shutter controller 145 of the camera controller 140.

The shutter unit 190 is can stay open mechanically in a state in which no power is being supplied, and is controlled by the camera controller 140 so that the open state is mechanically maintained when the supply of power to the camera body 100 has been halted. Here, the phrase "the open state is mechanically maintained" is a concept whereby the open state is maintained without the use of electrical force. Examples of the specific configuration by which the open state is mechanically maintained include a configuration in which a specific member is used at a position corresponding to the open state to support the front and rear curtains, and a configuration in which the front and rear curtains are supported by the magnetic force of a permanent magnet at a position corresponding to the open state.

Figure 6A:
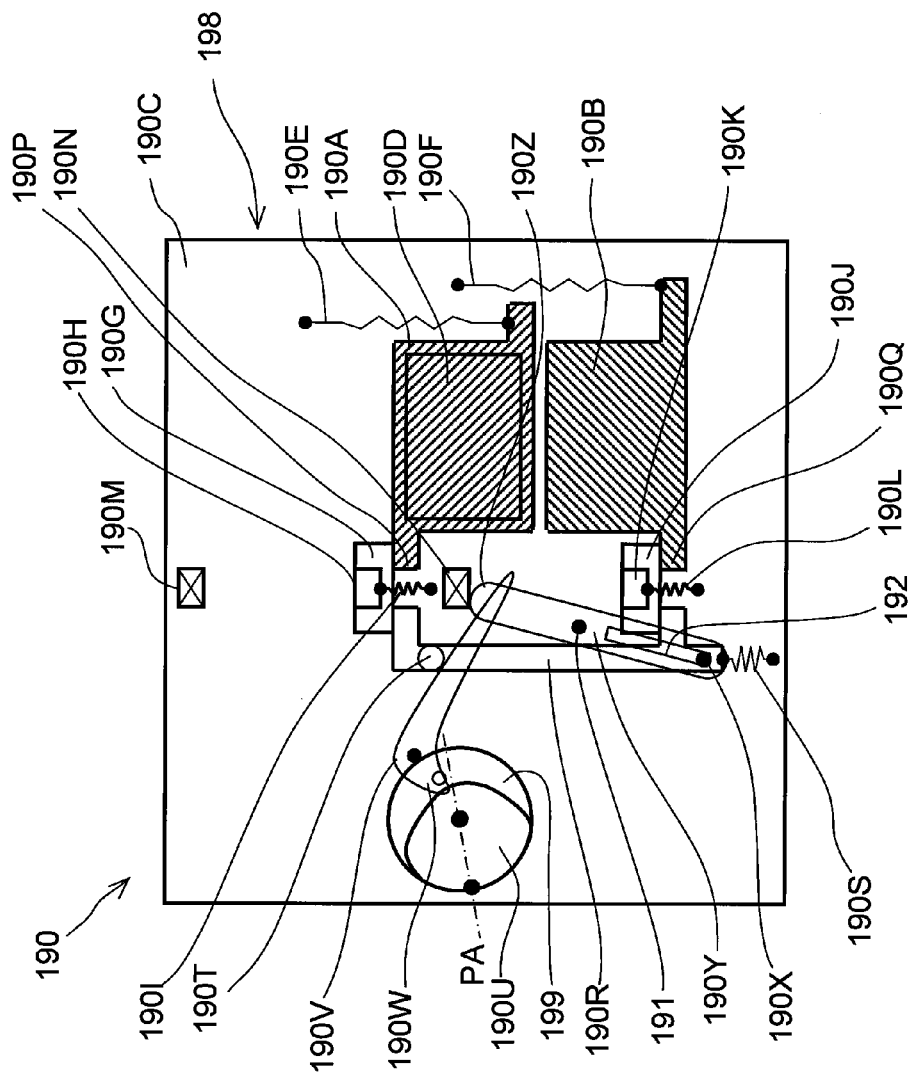
FIG. 6A is a schematic diagram of the open state of a shutter unit 190.
Figure 6B:
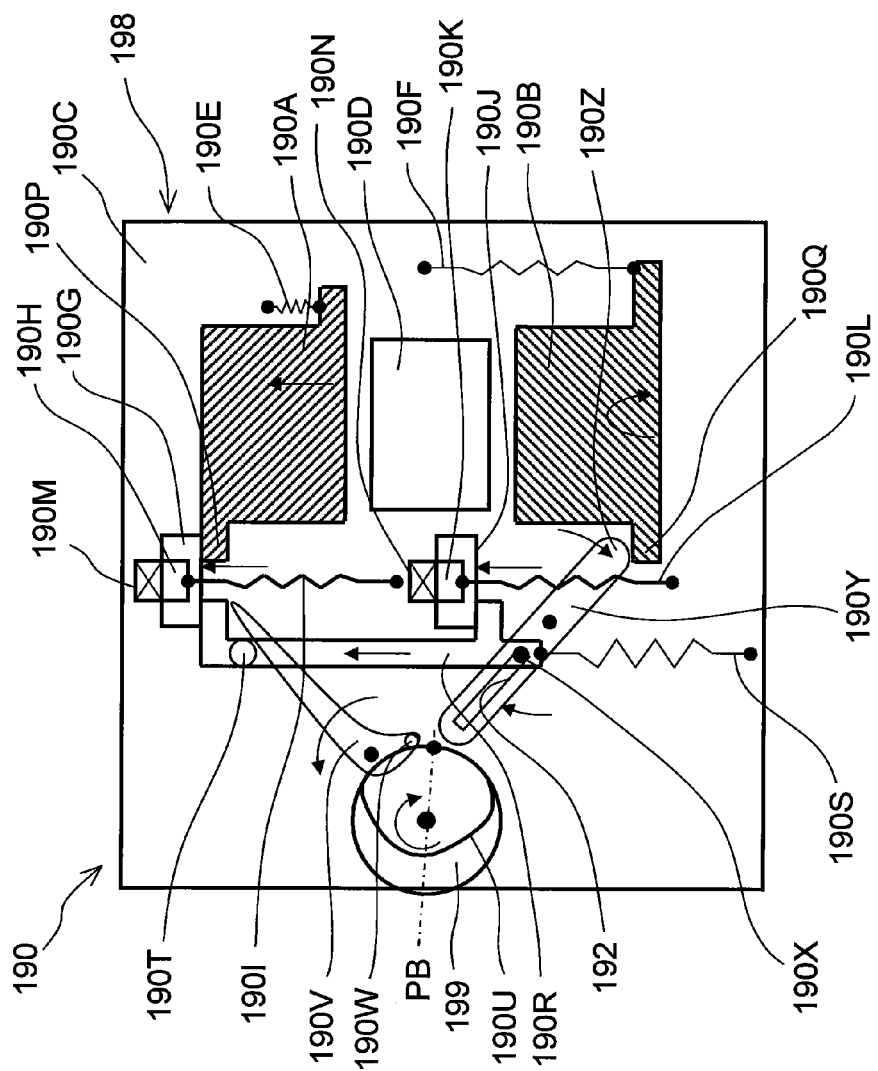
FIG. 6B is a schematic diagram of the open state of the shutter unit 190.
Figure 6C:
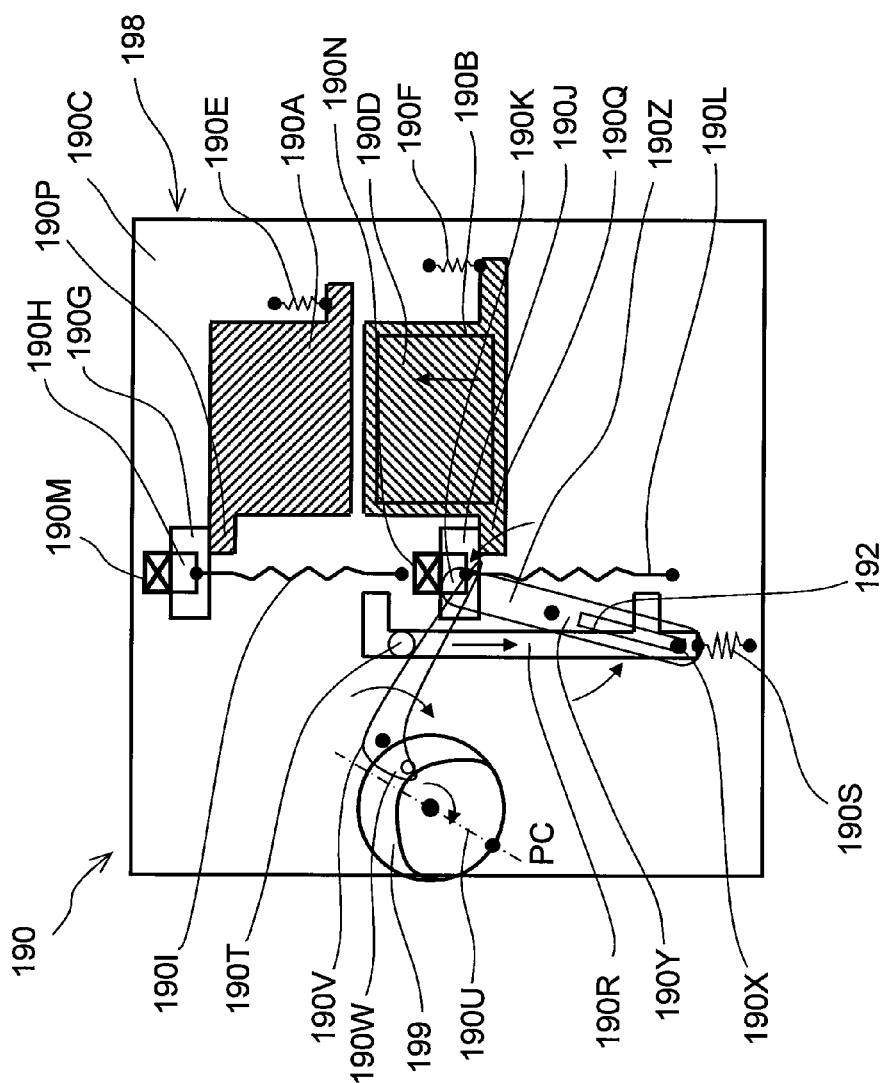
FIG. 6C is a schematic diagram of the shutter unit 190 when it is ready to move.
Figure 6D:
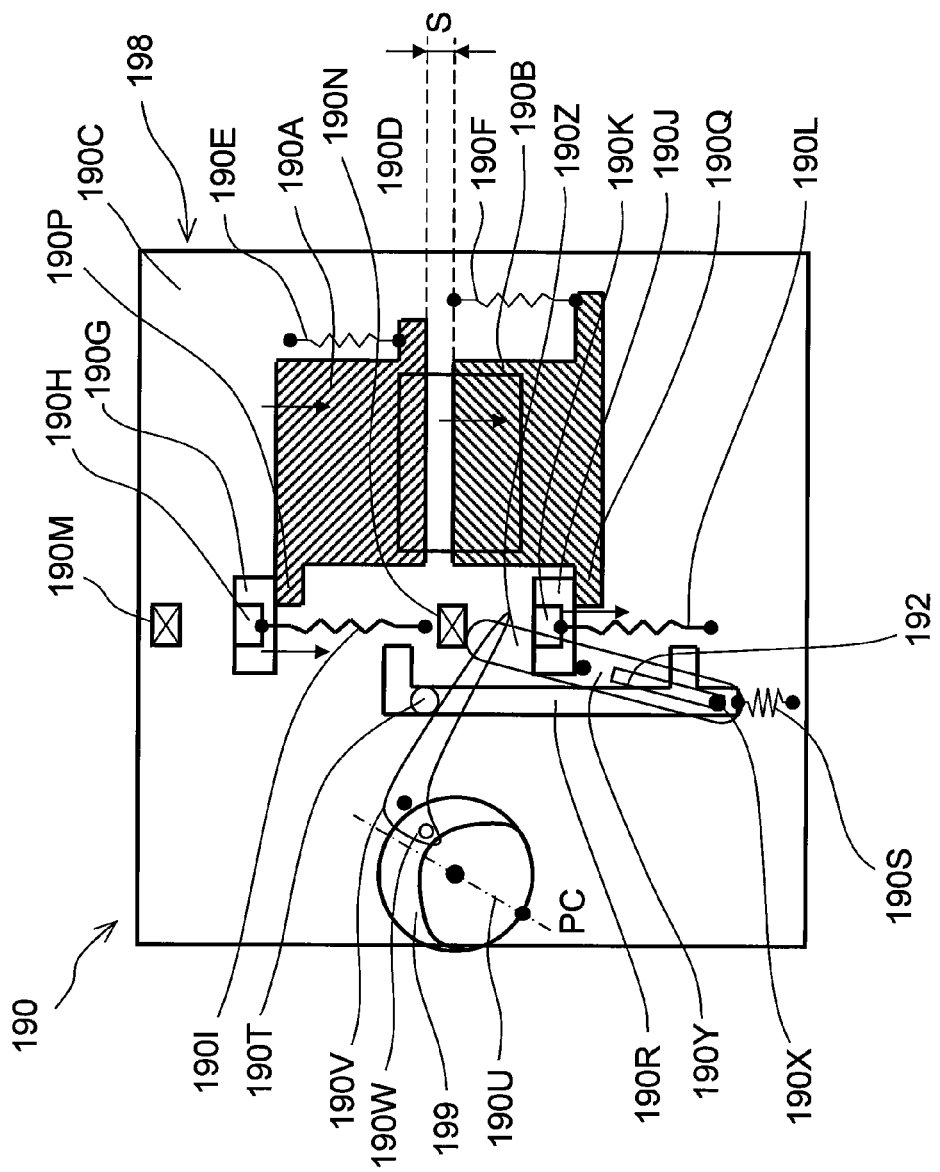
FIG. 6D is a schematic diagram of the shutter unit 190 while moving.

An embodiment of the shutter unit 190 will now be described through reference to FIGS. 6A to 6D. FIG. 6A is a schematic diagram of the closed state (an example of the second state) of the shutter unit 190. FIG. 6B is a schematic diagram of the open state (an example of the first state) of the shutter unit 190. FIG. 6C is a schematic diagram of the shutter unit 190 when it is ready to move. FIG. 6D is a schematic diagram of the shutter unit 190 while moving.

First, the closed state will be described through reference to FIG. 6A. The rear curtain 190A is pulled by a first spring 190E in the upward direction, that is, away from the opening 190D. The front curtain 190B is pulled by a second spring 190F in the upward direction, that is, in a direction that blocks the opening 190D. A first chucking piece 190H is attached to a rear curtain movement member 190G. The rear curtain movement member 190G is able to move in the up and down direction, and is biased in the downward direction by a third spring 190I. A second chucking piece 190K is attached to a front curtain movement member 190J. The front curtain movement member 190J is able to move in the up and down direction, and is biased in the downward direction by a fourth spring 190L. The third spring 190I has a larger spring coefficient than the first spring 190E. The fourth spring 190L has a larger spring coefficient than the second spring 190F. The first spring 190E, second spring 190F, third spring 190I, and fourth spring 190L are attached to the shutter support frame 190C, for example.

When current is sent to a first electromagnetic coil 190M and a second electromagnetic coil 190N in a state in which the first electromagnetic coil 190M and the first chucking piece 190H are in contact, and in which the second electromagnetic coil 190N and the second chucking piece 190K are in contact, the first chucking piece 190H is chucked to the first electromagnetic coil 190M, and the second chucking piece 190K is chucked to the second electromagnetic coil 190N by electromagnetic force. The first electromagnetic coil 190M and the second electromagnetic coil 190N are attached to the shutter support frame 190C, for example. In the closed state (FIG. 6A), no current is sent to the first electromagnetic coil 190M and the second electromagnetic coil 190N.

The rear curtain 190A and the front curtain 190B are able to move in the up and down direction. The rear curtain 190A is provided with a first contact component 190P, and the front curtain 190B is provided with a second contact component 190Q. The lower part of the rear curtain movement member 190G and the upper part of the first contact component 190P are designed to come into contact. The upper end of the vertical range of motion of the first contact component 190P is determined by the position of the rear curtain movement member 190G.

A charge member 190R is provided movably in the up and down direction, and is pulled downward by a fifth spring 190S. The charge member 190R has a first pin 190T, and the first pin 190T hits a charge lever 190V that is driven by the cam member 190U. The cam member 190U is rotationally driven by the shutter motor 199. The rotational position of the cam member 190U in the closed state (FIG. 6A) shall be called the closed position PA. Since the cam member 190U imparts force to a second pin 190W of the charge lever 190V when the cam member 190U is in the closed position PA state, the charge member 190R and the charge lever 190V are pulled down by the fifth spring 190S in this state.

The charge member 190R is able to come into contact with the lower part of the rear curtain movement member 190G and the lower part of the front curtain movement member 190J. In the closed state (FIG. 6A), since the charge member 190R is on the lower side, the rear curtain 190A and the front curtain 190B are pulled down by the elastic force of the third spring 190I and the fourth spring 190L. As a result, the rear curtain 190A blocks the opening 190D against the elastic force of the first spring 190E, and the front curtain 190B retracts from the opening 190D against the elastic force of the second spring 190F.

A third pin 190X of the charge member 190R is inserted into a guide slit 192 of a rotary lever 190Y. The rotational axis 191 of the rotary lever 190Y is supported by the shutter support frame 190C, so the rotary lever 190Y is able to rotate with respect to the shutter support frame 190C. When the charge member 190R moves up and down, the third pin 190X is guided by the guide slit 192, and as a result the rotary lever 190Y rotates according to the up and down motion of the charge member 190R.

The free end 190Z of the rotary lever 190Y on the opposite side from the guide slit 192 moves to the opposite side from the end on the third pin 190X in the up and down direction. The rotary lever 190Y is constituted so that the free end 190Z traces a path that allows contact with the upper end of the second contact component 190Q of the front curtain 190B. In the closed state (FIG. 6A), the free end 190Z is located at the top, so the second contact component 190Q of the front curtain 190B is not in contact with the free end 190Z.

Thus, the shutter unit 190 can be mechanically maintained in the closed state (FIG. 6A).

Next, the open state will be described through reference to FIG. 6B. when the cam member 190U is rotated to the right by the shutter motor 199 from the open state (FIG. 6A), the cam member 190U presses on the second pin 190W, and the charge lever 190V rotates to the left. At this point, since the first pin 190T of the charge member 190R is in contact with the charge lever 190V, the charge member 190R moves upward against the elastic force of the fifth spring 190S. The charge member 190R then comes into contact with the lower part of the rear curtain movement member 190G and the lower part of the front curtain movement member 190J, and the rear curtain movement member 190G and the front curtain movement member 190J are pushed upward by the charge lever 190V via the charge member 190R. As a result, the first contact component 190P of the rear curtain 190A moves upward under the elastic force of the first spring 190E and the second spring 190F and in a state of being in contact with the lower part of the rear curtain movement member 190G, and the second contact component 190Q of the front curtain 190B moves upward in a state of being in contact with the lower part of the front curtain movement member 190J.

When the charge member 190R moves up, at the same time the rotary lever 190Y rotates to the right, and when the upward movement of the charge member 190R has proceeded to a certain extent, the free end 190Z of the rotary lever 190Y comes into contact with the second contact component 190Q of the front curtain 190B, and the front curtain 190B is pushed back down by the rotary lever 190Y. When the cam member 190U rotates to the position shown in FIG. 6B (the open position PB) and stops, the various members are also in the state shown in FIG. 6B.

In the state shown in FIG. 6B, the elastic force of the fifth spring 190S, the third spring 190I, and the fourth spring 190L is acting on the charge member 190R, but since the second pin 190W of the charge lever 190V rides up onto the cam face that is concentric with the rotational center of the cam member 190U, the cam member 190U does not rotate under the force acting on the cam member 190U from the charge lever 190V. Accordingly, even if no current is sent to the shutter motor 199, the cam member 190U and the second pin 190W maintain the state shown in FIG. 6B, and the charge member 190R is maintained in a state of being located at the top.

As a result, the front curtain movement member 190J and the rear curtain movement member 190G are maintained in a state of being located at the top by the charge member 190R. At this point, the first chucking piece 190H is maintained in a state of being pressed by the first electromagnetic coil 190M, and the second chucking piece 190K is maintained in a state of being pressed by the second electromagnetic coil 190N. These states are maintained even if no current is being sent to the first electromagnetic coil 190M and the second electromagnetic coil 190N.

The rear curtain 190A is maintained by the elastic force of the first spring 190E at a top position, that is, a position away from the opening 190D. Also, since the free end 190Z of the rotary lever 190Y is maintained in a state of being located at the bottom, the front curtain 190B is maintained by the free end 190Z at a bottom position, that is, at a position away from the opening 190D. In other words, when the above-mentioned states of the various members are mechanically maintained, the open state (FIG. 6B) of the shutter unit 190 is mechanically maintained, and the optical path to the CMOS image sensor 110 is opened.

Thus, the shutter unit 190 can be mechanically maintained in the open state (FIG. 6B), even though no power is supplied, by rotationally driving the cam member 190U to the open position PB shown in FIG. 6B.

Next, a ready-to-move state will be described through reference to FIG. 6C. When the user presses the release button 131 of the camera body 100, current is sent to the first electromagnetic coil 190M and the second electromagnetic coil 190N, the first electromagnetic coil 190M chucks the first chucking piece 190H, and the second electromagnetic coil 190N chucks the second chucking piece 190K. After this, when the cam member 190U is driven to the right until it rotates to the position shown in FIG. 6C (the ready-to-move position PC), the mechanical hold of the charge lever 190V and the charge member 190R is released, and the charge lever 190V rotates to the right. When the charge lever 190V rotates to the right, the charge member 190R moves downward under the elastic force of the fifth spring 190S. At this point, the rear curtain movement member 190G and the front curtain movement member 190J are held in a state of being located at the top by the chucking force of the first electromagnetic coil 190M and the second electromagnetic coil 190N. Furthermore, the open state of the rear curtain 190A is maintained by the force of the first spring 190E.

Meanwhile, as the charge lever 190V rotates, the rotary lever 190Y rotates to the left, and the contact between the free end 190Z and the second contact component 190Q ceases. As a result, the front curtain 190B rises under the elastic force of the second spring 190F to a position where the second contact component 190Q comes into contact with the front curtain movement member 190J. Specifically, the front curtain 190B blocks the opening 190D. When the second contact component 190Q comes into contact with the front curtain movement member 190J, the front curtain 190B stops at the closed position, and maintains the blocked state. At this point the charge member 190R is retracted from the movement path in the downward direction of the rear curtain movement member 190G and the front curtain movement member 190J.

Next, the state during movement will be discussed through reference to FIG. 6D. During movement, there is no change in the motion of the cam member 190U, the charge lever 190V, the charge member 190R, and the rotary lever 190Y. When current to the second electromagnetic coil 190N is shut off from the ready-to-move state (FIG. 6C), the chucking force acting between the second electromagnetic coil 190N and the second chucking piece 190K is released. As a result, since the downward elastic force of the fourth spring 190L acting on the front curtain 190B through the front curtain movement member 190J is greater than the upward elastic force of the second spring 190F exerted on the front curtain 190B, the front curtain 190B moves downward, causing the opening 190D to open.

When current is sent to the first electromagnetic coil 190M after the front curtain 190B has started to move (that is, after the current to the second electromagnetic coil 190N has been blocked), the chucking force between the first electromagnetic coil 190M and the first chucking piece 190H is released. When this happens, since the downward elastic force of the first spring 190E acting on the rear curtain 190A through the rear curtain movement member 190G is greater than the upward elastic force of the first spring 190E exerted on the rear curtain 190A, the rear curtain 190A moves down, and as a result the opening 190D is blocked by the rear curtain 190A. The front curtain 190B and the rear curtain 190A move with the gap S maintained. When the movement is complete, the result is an open state (FIG. 6A).

While the front curtain 190B and the rear curtain 190A are moving, the light that passes through the gap S formed between the front curtain 190B and the rear curtain 190A is incident on the CMOS image sensor 110. The movement of the front curtain 190B and the rear curtain 190A causes the gap S to move from top to bottom, and the entire camera body 100 is exposed. How long the CMOS image sensor 110 is exposed can be controlled by suitably adjusting the size of the gap S. More specifically, the CMOS image sensor 110 can be exposed for the desired length of time by setting the time from the point when the front curtain 190B is no longer supported until the point when the rear curtain 190A is no longer supported to the desired exposure time.

When a moving picture is captured with the CMOS image sensor 110 or when a still picture is captured again, there is a transition from a light blocking state (FIG. 6A) to an open state (FIG. 6B) by rotation of the cam member 190U up to the open position PB.

The configuration discussed above is an example of a shutter unit that mechanically maintains an open state. Also, the cam member 190U, the charge lever 190V, the charge member 190R, the rotary lever 190Y, the first spring 190E, and so forth are examples of a mechanical lock mechanism for maintaining the open state of the shutter unit 190.

The optical low-pass filter 114 eliminates the high-frequency component of subject light. More specifically, the optical low-pass filter 114 separates a subject image formed by the lens unit 200 so that the resolution is coarser than the pitch of the pixels of the CMOS image sensor 110. In general, the CMOS image sensor 110 or other imaging element has an RGB color filter called a Bayer pattern, or a YCM complementary color filter, provided for each pixel. Therefore, if the resolution goes to one pixel, not only will a false color be generated, but if the subject is a repeating pattern, an unattractive moire will result. Furthermore, the optical low-pass filter 114 has an Ir cut filter function for cutting out infrared light.

The diaphragm 115 is disposed along the optical path from the lens unit 200 to the CMOS image sensor 110, and is disposed in front of the CMOS image sensor 110 (on the subject side). The diaphragm 115 also prevents dust from clinging to the CMOS image sensor 110, and knocks off by vibration any dust that clings to itself. More specifically, the diaphragm 115 has a base frame (not shown) supported by the housing member 101, a thin, transparent protective sheet 115*b*, and a piezoelectric element (not shown) that imparts vibration to the protective sheet 115*b*. AC voltage is applied to the piezoelectric element, which causes the piezoelectric element to vibrate, and this vibrates the protective sheet 115*b* with respect to the base frame.

As shown in FIGS. 2 and 4, the protective sheet 115*b* has an exposed region A1 that is exposed to the outside through the opening 190D of the shutter unit 190 in a state in which the lens unit 200 is being removed. An anti-condensation layer is formed on the front face of the exposed region A1 (the face on the subject side). More specifically, the exposed region A1 is coated with a transparent photocatalyst such as titanium oxide. This photocatalyst transmits visible light.

The anti-condensation layer may be formed on the front face of the optical low-pass filter 114, or may also be formed on the front face of the CMOS image sensor 110. The anti-condensation layer is preferably provided to the front face of the member that is disposed at the very front of the members that are disposed along the optical path from the lens unit 200 to the CMOS image sensor 110 and that transmit light from the lens unit 200. In this embodiment, the diaphragm 115 on which the anti-condensation layer is formed is disposed at the very front of the members that transmit light from the lens unit 200, so even if the shutter unit 190 is in the open state, any water, oil, or the like from saliva or the like that has found its way into the body mount 150 can be easily removed from the surface of the diaphragm 115 by the titanium oxide, which is a photocatalyst.

More specifically, when light hits titanium oxide, electrons scatter, generating a powerful oxidative force. A surface having this powerful oxidative force robs electrons from hydroxide ions in the air, and the hydroxide ions become unstable hydroxy radicals. These hydroxy radicals also have a powerful oxidative force, so they rob electrons from any nearby organic matter, and the organic matter turns into carbon dioxide and water and is released into the air. Also, this effect is even more pronounced if the diaphragm 115 is vibrated. Furthermore, the photocatalyst is preferably one that absorbs ultraviolet rays, such as titanium oxide, or one that absorbs infrared rays. Since these transmit visible light, it means that less visible light will reach the CMOS image sensor 110.

1-3: Configuration of Lens Unit

The lens unit 200 comprises an optical system, the lens controller 240, the lens mount 250, an aperture unit 260, and a lens barrel 290. The optical system of the lens unit 200 includes a zoom lens 210, an OIS lens 220, and a focus lens 230. The optical system is housed inside the lens barrel 290. Also, a zoom ring 213, a focus ring 234, and an OIS switch 224 are provided to the outer part of the lens barrel.

The zoom lens 210 is a lens for changing the magnification of the optical image of the subject (hereinafter also referred to as a subject image) formed by the optical system of the lens unit 200, or in other words, for changing the focal length of the optical system. The zoom lens 210 is made up of one or more lenses. The zoom lens 210 includes a first lens group L1 and a second lens group L2 of the optical system. The focal length of the optical system changes when the zoom lens 210 moves in a direction parallel to the optical axis AX.

The zoom ring 213 is a cylindrical member that is able to rotate around the outer peripheral face of the lens barrel 290. When the zoom ring 213 is turned by the user, a drive mechanism 211 conveys this operation to the zoom lens 210 and moves the zoom lens 210 along the optical axis AX of the optical system.

A detector 212 detects the drive amount of the drive mechanism 211. The lens controller 240 and/or the camera controller 140 ascertains the focal length of the optical system by acquiring the detection result from this detector 212. Also, the lens controller 240 and/or the camera controller 140 can ascertain the position of the zoom lenses (L1, L2, etc.) in the optical axis AX direction within the lens unit 200 by acquiring the detection result from this detector 212. The drive mechanism 211 should be able to move the zoom lens 210 along the optical axis AX direction. For example, the drive mechanism 211 may be such that it conveys to the zoom lens 210 the drive force from a motor or other such drive force generator according to the rotational position of the zoom ring 213 or another such manipulation component, and moves the zoom lens 210 to a position in the optical axis AX direction corresponding to the rotational position of the zoom ring 213.

The OIS lens 220 is a lens for correcting blurring of the subject image formed by the optical system of the lens unit 200. The OIS lens 220 is made up of one or more lenses. An actuator 221 is under the control of an OIS-use IC 223, and drives the OIS lens 220 within a plane perpendicular to the optical axis AX of the optical system.

The actuator 221 can be a magnet and a flat coil, for example. A position detecting sensor 222 is a sensor for detecting the position of the OIS lens 220 in a plane perpendicular to the optical axis AX of the optical system. The position detecting sensor 222 can be a magnet and a Hall element, for example. The OIS-use IC 223 controls the actuator 221 on the basis of the detection result of the position detecting sensor 222 and the detection result of a gyro sensor or other such shake detector. The OIS-use IC 223 obtains the detection result of the shake detector from the lens controller 240. The OIS-use IC 223 also sends a signal to the lens controller 240 indicating the status of optical image shake correction processing.

The OIS lens 220 is an example of a blur corrector. Electronic blur correction that produces corrected image data on the basis of image data from a CCD may be used as a means for correcting blurring of the subject image caused by shaking of the digital camera 1. Also, a configuration in which the CMOS image sensor 110 is driven within a vertical plane parallel to the optical axis AX of the optical system may be used as a means for reducing the relative blurring between the subject image and the CMOS image sensor 110 caused by shaking of the digital camera 1.

The OIS switch 224 is an example of a manipulation component for manipulating the OIS. When the OIS switch 224 is switched off, the OIS lens 220 does not operate. When the OIS switch 224 is switched on, the OIS lens 220 is able to operate.

The focus lens 230 is a lens for changing the focal state of the subject image formed by the optical system on the CMOS image sensor 110. The focus lens 230 is made up of one or more lenses. The zoom lens 210 changes the focal state of the subject image by moving in a direction parallel to the optical axis AX of the optical system.

A focus motor 233 drives the focus lens 230 to move forward and backward along the optical axis AX of the optical system under the control of the lens controller 240. This makes it possible to change the focal state of the subject image formed by the optical system on the CMOS image sensor 110. The focus motor 233 can drive the focus lens 230 independently of the drive of the zoom lens 210. More specifically, the focus motor 233 drives the focus lens 230 in the optical axis AX direction using the second lens group L2 as a reference. In other words, the focus motor 233 is able to modify the relative distance between the second lens group L2 and the focus lens 230 in the optical axis AX direction. The focus lens 230 and the focus motor 233 move in the optical axis AX direction along with the second lens group L2. Therefore, when the second lens group L2 moves in the optical axis AX direction due to zooming, the focus lens 230 and the focus motor 233 also move in the optical axis AX direction. Also, even in a state in which the second lens group L2 is stationary in the optical axis AX direction, the focus motor 233 can drive the focus lens 230 in the optical axis AX direction using the second lens group L2 as a reference. The focus motor 233 can be a DC motor, a stepping motor, a servo motor, an ultrasonic motor, or the like.

A relative position detector 231 and an absolute position detector 232 are encoders that produce signals indicating the drive state of the focus lens 230. The relative position detector 231 has a magnetic scale and a magnetic sensor, detects a change in magnetism, and outputs a signal corresponding to the change in magnetism. An example of a magnetic sensor is an MR sensor. The absolute position detector 232 is a home detector that detects the home position of the focus lens 230 with respect to the second lens group L2. The absolute position detector 232 is a photosensor, for example. The lens controller 240 recognizes that the focus lens 230 is at the home point from a signal from the absolute position detector 232. At this point the lens controller 240 resets the value of a counter 243 that is provided internally. This counter 243 counts the extreme values of magnetic changes by using signals outputted from the relative position detector 231. Consequently, the lens controller 240 is able to ascertain the position of the focus lens 230 in the optical axis AX direction with respect to the second lens group L2 by detecting the relative position from the home position, which is an absolute position. Also, as mentioned above, the lens controller 240 is able to ascertain the position of the second lens group L2 in the optical axis AX direction within the lens unit 200. Therefore, the lens controller 240 is able to ascertain the position of the focus lens 230 in the optical axis AX direction within the lens unit 200.

The aperture unit 260 is a light quantity adjusting member that adjusts the quantity of light transmitted by the optical system. The aperture unit 260 has aperture vanes that can block part of the light rays transmitted by the optical system, and an aperture driver that adjusts the quantity of light by driving the aperture vanes and varying the amount of blockage thereof. The camera controller 140 directs the operation of the aperture unit 260 on the basis of the quantity of light received by the CMOS image sensor 110, whether still picture or moving picture imaging is to be performed, whether or not there has been an operation in which an aperture value has been preferentially set, and so forth.

The lens controller 240 controls the various components of the lens unit 200, such as the OIS-use IC 223 and the focus motor 233, on the basis of control signals from the camera controller 140. It also receives signals from the detector 212, the OIS-use IC 223, the relative position detector 231, the absolute position detector 232, and so forth, and sends these to the camera controller 140. The lens controller 240 exchanges signals with the camera controller 140 via the lens mount 250 and the body mount 150. The lens controller 240 uses a DRAM 241 as a working memory. Also, a flash memory 242 stores programs and parameters used in control by the lens controller 240.

1-4: Features of Configuration

The camera body 100 does not have a mirror box apparatus. Also, flange back can be shortened, and the camera body 100 can be made more compact. Furthermore, since the flange back is shorter, there is greater latitude in the design of the optical system, and the lens unit 200 can be made more compact. Therefore, the digital camera 1 can be made more compact.

However, when a mirror box apparatus is eliminated, the shutter unit 190 and other such parts are disposed close to the body mount 150, so there is the risk of these parts being damaged when the lens unit 200 moves into the body mount 150 at an angle.

Figure 7:
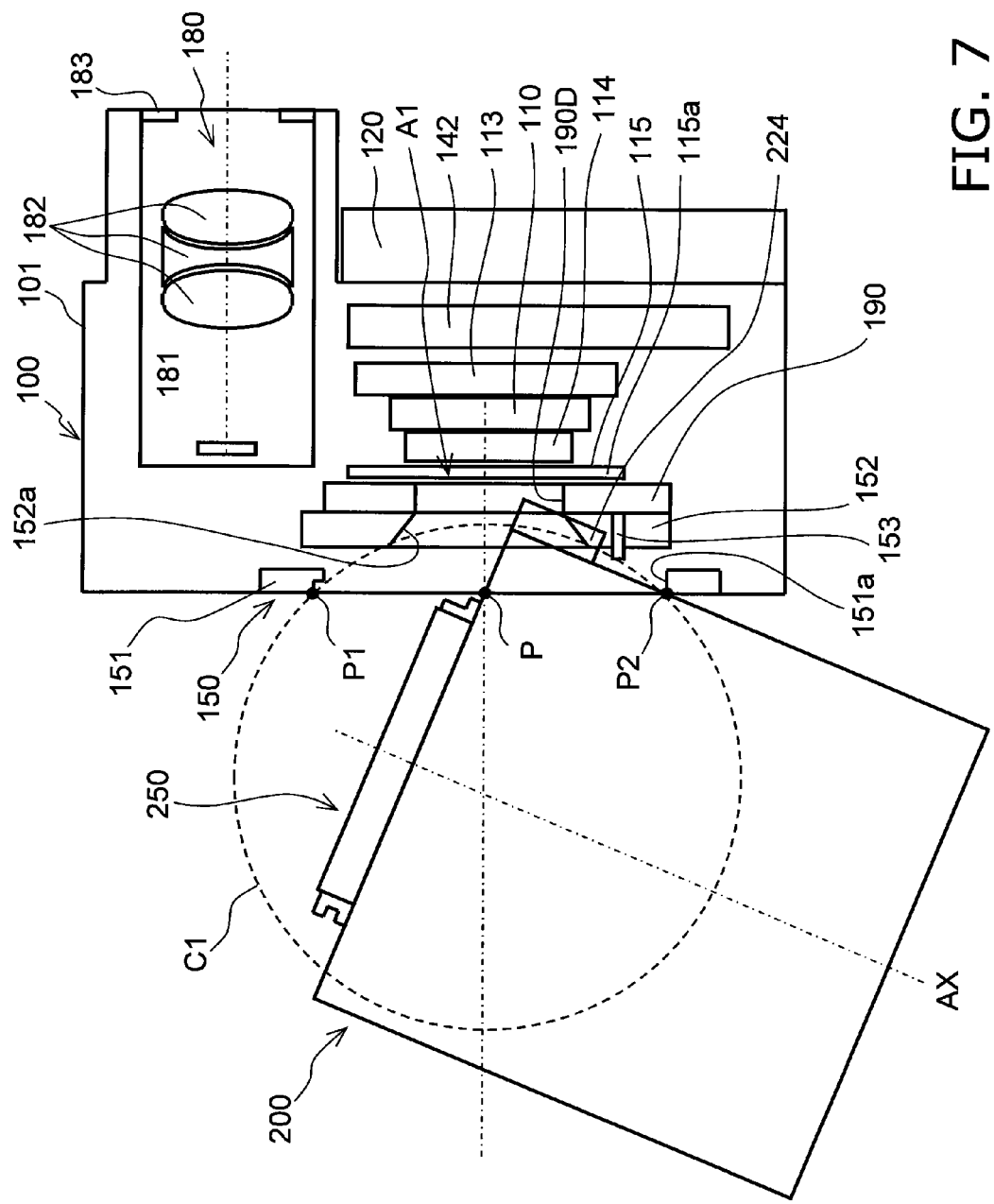
FIG. 7 is a diagram illustrating the insertion state of a lens unit 200.

FIG. 7 is an example of the state during the mounting of the lens unit 200. The imaginary circle C1 drawn with a broken line is a circle that is the same size as the outside diameter of the lens unit 200. The imaginary circle C1 is touching two points P1 and P2 and the first opening 151a of the body mount ring 151. In this state, the imaginary circle C1 is able to go inside the camera body 100. The imaginary circle C1 goes into the camera body 100 best when a line connecting the two points P1 and P2 where the lens unit 200 touches the body mount ring 151 passes through the center of the first opening 151a of the body mount ring 151. The smaller is the diameter of the imaginary circle C1, the more readily the imaginary circle C1 goes into the camera body 100.

If an attempt is made to bring the lens unit 200 into contact with the body mount ring 151 in a state in which the lens unit 200 is tilted with respect to the body mount ring 151, part of the lens unit 200 will go inside the camera body 100. In the state shown in FIG. 7, the lens unit 200 touches the body mount ring 151 at two points where a line passing through the point P and perpendicular to the paper surface intersects the first opening 151a of the body mount ring 151. If the lens unit 200 is then tilted while the contact state at these two points is maintained, the lens unit 200 touches the point P2. The lens unit 200 most readily goes into the camera body 100 in this state. Thus, the lens unit 200 goes into the interior of the camera body 100 when it touches the body mount ring 151 in a tilted state.

With the digital camera 1, since a reduction in the size of the camera body 100 also leads to a reduction in the size of the lens unit 200, the outside diameter of the lens unit 200 is smaller (that is, the imaginary circle C1 is smaller), and amount by which the lens unit 200 goes into the camera body 100 tends to be greater. Also, since flange back can be decreased with the camera body 100, parts can be disposed closer to the body mount 150, and as a result, it is more likely that members inside the camera body 100 and the lens unit 200 will interfere with each other. The shutter unit 190 is particularly susceptible to damage because the rear curtain 190A and the front curtain 190B are low in strength. Furthermore, a manipulation component that sticks out, such as the OIS switch 224, may be provided on the outside of the lens unit 200. It is conceivable that such members will go into the interior of the camera body 100 as shown in FIG. 7.

In view of this, the shutter unit 190 is designed so that the open state can be maintained while the supply of power from the power supply 160 has been halted. More specifically, the shutter unit 190 has a mechanical locking mechanism, and is controlled by the camera controller 140 so that the open state is mechanically maintained in a state in which the supply of power from the power supply 160 has been halted. Therefore, the open state of the shutter unit 190 is maintained when the supply of power has been halted, and if the lens unit 200 is replaced in a state in which the supply of power from the power supply 160 has been halted, damage to the shutter unit 190 (and particular the rear curtain 190A and front curtain 190B) can be prevented even if the lens unit 200 should accidentally enter the interior of the camera body 100.

The position of the lens unit 200 in FIG. 7 shows the state of intrusion into the camera body 100 when there is no body mount contact support 152, but since the body mount contact support 152 interferes with the lens unit 200 ahead of the shutter unit 190, the lens unit 200 can be prevented from coming into contact with the shutter unit 190.

Also, since the inside diameter of the second opening 152a of the body mount contact support 152 is smaller than the inside diameter of the first opening 151a of the body mount ring 151, intrusion of the lens unit 200 into the interior can be prevented more effectively, and damage to the shutter unit 190 can also be prevented more effectively.

Maintaining the open state of the shutter unit 190 could result in water, oil, or the like from saliva or the like adhering to the very front face of the member disposed at the very front of the members that are disposed along the optical path from the lens unit 200 to the CMOS image sensor 110 and that transmit light from the lens unit 200, but this problem is diminished by providing the anti-condensation layer to the front face of the diaphragm 115.

2: Operation 2-1: Still Picture Imaging Operation

When the still picture imaging mode is selected with the manipulation unit 130, the camera controller 140 controls the CMOS image sensor 110 so as to perform moving picture imaging. The captured moving picture is displayed on the camera monitor 120 or the EVF 180. At this point, the moving picture is not recorded to the memory card 171. The user determines the composition by looking at the camera monitor 120 or the EVF 180. AE control and AF control are carried out on the basis of image data outputted from the CMOS image sensor 110. At this point the shutter unit 190 is mechanically maintained in the open state. More specifically, the rear curtain 190A is mechanically maintained at the position corresponding to the open state (FIG. 6B).

When the release button 131 is pressed, the shutter unit 190 is driven as discussed above, the rear curtain 190A and front curtain 190B go through the ready-to-move state (FIG. 6C) and then move (FIG. 6D), and the CMOS image sensor 110 is exposed. At this point image data is acquired by the CMOS image sensor 110. The camera controller 140 subjects the image data to specific image processing, and records image data or moving picture data to the memory card 171. After this, the shutter controller 145 of the camera controller 140 controls the shutter motor 199 of the shutter unit 190 so that the open state of the shutter mechanism 198 is mechanically maintained. More specifically, the cam member 190U is rotationally driven to the open position PB shown in FIG. 6B by the shutter motor 199 on the basis of a control signal produced by the shutter controller 145, and the open state shown in FIG. 6B is mechanically maintained. Consequently, even if the supply of power from the power supply 160 should be halted in the middle of the still picture imaging mode, the open state of the shutter unit 190 can be maintained while the supply of power is halted, and this prevents damage to the front curtain 190B and rear curtain 190A of the shutter unit 190 in a state in which the lens unit 200 is being removed from the camera body 100.

2-2: Moving Picture Imaging Operation

When the moving picture imaging mode is selected with the manipulation unit 130, the camera controller 140 controls the CMOS image sensor 110 so that moving picture imaging is performed. The captured moving picture is displayed on the camera monitor 120 or the EVF 180. At this point the moving picture is not recorded to the memory card 171. The user determines the composition by looking at the camera monitor 120 or the EVF 180. AE control and AF control are carried out on the basis of image data outputted from the CMOS image sensor 110.

When the manipulation unit 130 is operated to direct the start of moving picture recording, the camera controller 140 subjects the moving picture data outputted from the CMOS image sensor 110 to specific processing, and records the moving picture data or moving picture file to the memory card 171. When the manipulation unit 130 is operated to direct the stopping of moving picture recording, the camera controller 140 stops the recording of the moving picture data or moving picture file.

In the moving picture imaging mode, the shutter controller 145 of the camera controller 140 controls the shutter motor 199 of the shutter unit 190 so that the open state of the shutter mechanism 198 is mechanically maintained. More specifically, the cam member 190U is rotationally driven to the open position PB shown in FIG. 6B by the shutter motor 199 on the basis of a control signal produced by the shutter controller 145, and the open state shown in FIG. 6B is mechanically maintained. Consequently, even if the supply of power from the power supply 160 should be halted in the middle of the moving picture imaging mode, the open state of the shutter unit 190 can be maintained while the supply of power is halted, and this prevents damage to the front curtain 190B and rear curtain 190A of the shutter unit 190 in a state in which the lens unit 200 is being removed from the camera body 100.

2-3: Reproduction Operation

When the manipulation unit 130 is operated to select reproduction mode, camera controller 140 expands the image data, image file, moving picture data, or moving picture file acquired from the memory card 171 to produce display-use image data or display-use moving picture data. The resulting display-use image data or display-use moving picture data is displayed on the camera monitor 120 or the EVF 180.

In reproduction mode, the shutter controller 145 of the camera controller 140 controls the shutter unit 190 so that the open state of the shutter unit 190 is mechanically maintained. More specifically, the shutter controller 145 can ascertain the rotational position of the cam member 190U by counting the drive signals of the shutter motor 199. If the cam member 190U is away from the open position PB shown in FIG. 6B, the shutter controller 145 drives the shutter motor 199 so that the cam member 190U moves to the open position PB. If the cam member 190U is already at the open position PB, then the shutter controller 145 does not drive the shutter motor 199.

This control allows the open state of the shutter unit 190 to be mechanically maintained in reproduction mode. Therefore, even if the supply of power from the power supply 160 should be halted in the middle of the reproduction mode, the open state of the shutter unit 190 can be maintained while the supply of power is halted.

2-4: Other Operation

In other operating modes, such as a mode in which the various settings of the camera are adjusted, basically the shutter controller 145 of the camera controller 140 controls the shutter unit 190 so that the open state is mechanically maintained. Therefore, even if the supply of power from the power supply 160 of the camera body 100 should unintentionally be halted, the open state of the shutter unit 190 can be reliably maintained in a state in which the supply of power from the power supply 160 has been halted.

2-5: Summary of Shutter Unit Operation

As discussed above, the shutter unit 190 maintains the open state when the supply of power from the power supply 160 has been halted. This operation is achieved by control of the shutter unit 190 by the camera controller 140 as discussed above, prior to the halting of the supply of power from the power supply 160.

In a state in which the supply of power from the power supply 160 has been halted, it cannot be detected that the lens unit 200 has been removed from the camera body 100. Specifically, this is a situation in which the shutter unit 190 cannot be put in an open state after the lens unit 200 has been removed from the camera body 100. However, with the camera body 100 pertaining to this embodiment, since the shutter unit 190 is in the open state when the lens unit 200 is mounted to the camera body 100, it is possible to reduce damage to the shutter unit 190 caused when the lens unit 200 goes into the body mount 150 in the mounting of the lens unit 200 to the camera body 100.

3: Features

The features of the digital camera 1 described above will now be compiled.

(1) With this camera body 100, the shutter unit 190 is controlled by the shutter controller 145 prior to the halting of the supply of power so that the shutter unit 190 is maintained in the open state when the supply of power has been halted. Consequently, the open state of the shutter unit 190 can be maintained when the supply of power has been halted, and damage to the shutter unit 190 can be prevented in a state in which the lens unit 200 is being removed from the camera body 100.

Also, since the shutter unit 190 can be mechanically maintained in the open state (the state shown in FIG. 6B), it is easy to maintain the open state of the shutter unit 190 when the supply of power has been halted.

(2) The shutter unit 190 has the shutter mechanism 198 and the shutter motor 199 that drives the shutter mechanism 198. The shutter motor 199 can drive the shutter mechanism 198 between a first state in which the open state is mechanically maintained (the state shown in FIG. 6B) and a second state in which the closed state is maintained (the state shown in FIG. 6A). Furthermore, the shutter controller 145 drives the shutter mechanism 198 to the state shown in FIG. 6B under specific conditions.

For example, the lens detector 146 detects whether or not the lens unit 200 is mounted to the body mount 150, and if the lens unit 200 is being removed from the body mount 150, the shutter controller 145 controls the shutter unit 190 so as to maintain the shutter unit 190 in the open state. More precisely, the shutter controller 145 controls the shutter motor 199 so as to drive the shutter mechanism 198 to the state shown in FIG. 6B when the lens unit 200 is being removed from the body mount 150. Accordingly, even if the lens unit 200 is removed from the camera body 100 while the power is on, the shutter unit 190 can be maintained in the open state, and damage to the shutter unit 190 can be prevented.

Also, in reproduction mode, the shutter unit 190 is controlled by the shutter controller 145 so as to maintain the shutter unit 190 in the open state. More precisely, in reproduction mode the shutter motor 199 is controlled by the shutter controller 145 so as to drive the shutter mechanism 198 to the state shown in FIG. 6B. With this configuration, the open state of the shutter unit 190 can be maintained even if the power is switched off in reproduction mode.

Further, when the power switch 132 is moved to "off," the shutter unit 190 is controlled by the shutter controller so as to maintain the shutter unit 190 in the open state. More precisely, the shutter motor 199 is controlled by the shutter controller 145 so as to drive the shutter mechanism 198 to the state shown in FIG. 6B when the power switch 132 is moved to "off." With this configuration, the shutter unit 190 can be switched to the open state prior to the halting of the supply of power.

As described above, damage to the shutter unit 190 can be reliably prevented with the camera body 100.

(3) As shown in FIGS. 2 and 3, since the inside diameter of the second opening 152a of the body mount contact support 152 is smaller than the inside diameter of the first opening 151a of the body mount ring 151, even if part of the lens unit 200 should intrude into the camera body 100 through the first opening 151a of the body mount ring 151, the body mount contact support 152 can prevent intrusion of the lens unit 200, and damage to the shutter unit 190 and other such parts can be prevented.

(4) When the shutter unit 190 is maintained in the open state in a state in which the lens unit 200 is being removed from the body mount 150, the CMOS image sensor 110 and the optical low-pass filter 114 disposed on the subject side of the CMOS image sensor 110 are apt to be soiled by dust, saliva, or other such substances.

With this camera body 100, since the protective sheet 115b is disposed along the optical path from the lens unit 200 to the CMOS image sensor 110, soiling of the CMOS image sensor 110 and the optical low-pass filter 114 is prevented.

Also, since an anti-condensation layer including a photocatalyst is provided to the exposed region A1 of the protective sheet 115b, soiling of the protective sheet 115b is suppressed or easily removed. Furthermore, since the anti-condensation layer is a photocatalyst that transmits light, the subject light can be efficiently guided to the CMOS image sensor 110 even though the anti-condensation layer is provided to the surface of the protective sheet 115b.

Second Embodiment

Figure 8A:
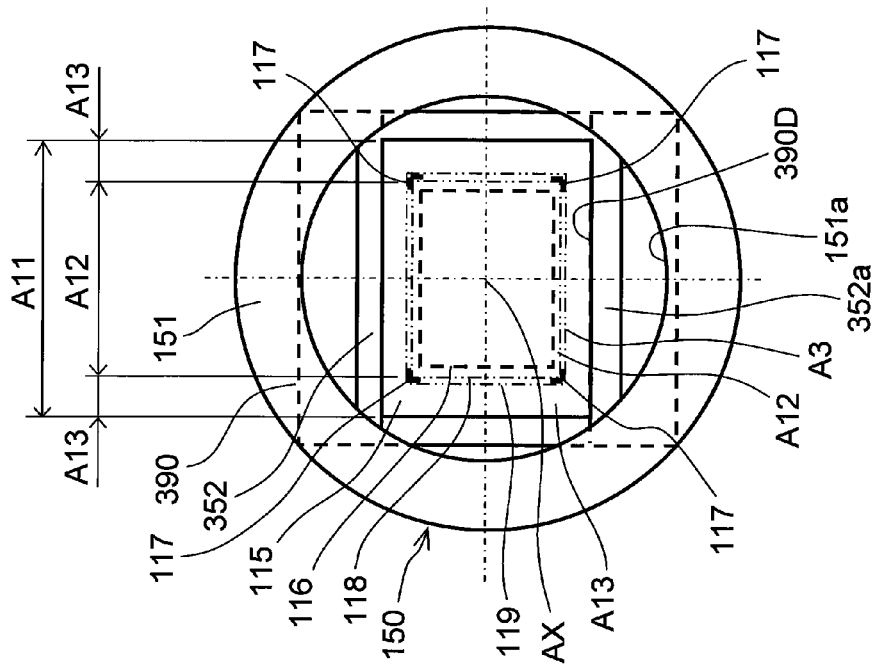
FIG. 8A is a plan view of a body mount 150 and its surroundings.
Figure 8B:
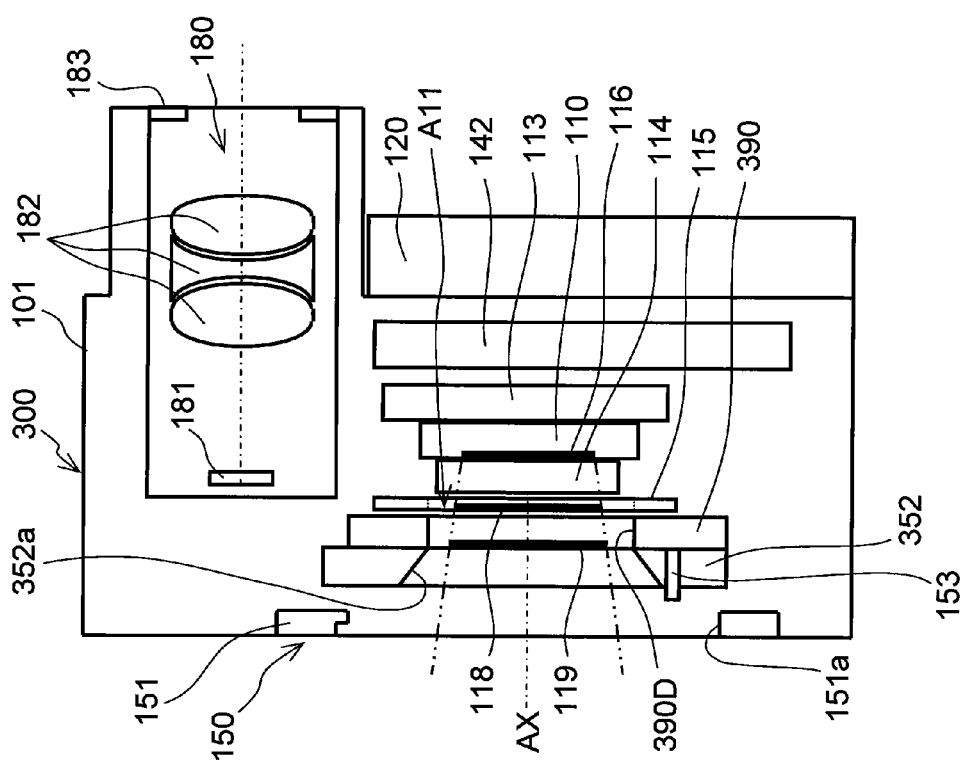
FIG. 8B is a simplified configuration diagram of a camera body 300.

Only those differences from the camera body 100 in the first embodiment will be described here, and portions that are shared will not be described again. Furthermore, those components having substantially the same function as in the first embodiment will be numbered the same. A camera body 300 pertaining to a second embodiment will now be described. FIG. 8A is a plan view of a body mount 150 and its surroundings. FIG. 8B is a simplified configuration diagram of the camera body 300.

The camera body 100 of the first embodiment has the diaphragm 115 and an anti-condensation layer on the front face thereof, but even so, dust or other such dirt may adhere. If this happens, the user may try to remove the dirt by wiping this face with a cloth or the like.

However, it is difficult to completely wipe away the dirt. In particular, dirt tends to be pushed to the edges of the regions wiped with a cloth or the like, and this dirt tends to remain.

In view of this, with this camera body 300, a region where it is alright for dirt to remain is provided to the member disposed at the very front of the members that are disposed along the optical path from the lens unit 200 and the CMOS image sensor 110 and that transmit light from the lens unit 200.

More specifically, as shown in FIGS. 8A and 8B, a second opening 352a in a body mount contact support 352 is larger than the second opening 152a in the body mount contact support 152 in the first embodiment above, and an opening 390D in a shutter unit 390 is larger than the opening 190D in the shutter unit 190. Therefore, more of the protective sheet 115b of the diaphragm 115 is exposed to the outside.

More precisely, the protective sheet 115b has an exposed region A11 where the opening 390D of the shutter unit 390 is exposed to the outside in a state in which the lens unit 200 is removed. Just as with the exposed region A1 discussed above, an anti-condensation layer is formed on the front face (the face on the subject side) of the exposed region A11. More specifically, the exposed region A11 is coated with a transparent photocatalyst such as titanium oxide. This photocatalyst transmits visible light. The exposed region A11 further has a transmission region A12 and an outer region A13.

The transmission region A12 corresponds to a region 118 of the protective sheet 115b in which light that passes through the lens unit 200 goes through, and is disposed along the optical path from the lens unit 200 to the CMOS image sensor 110. The outer region A13 is formed in a range that is more to the outside than the transmission region A12 as seen from the subject side, and is disposed outside the optical path of the lens unit 200. Accordingly, light that passes through the lens unit 200 does not pass through the outer region A13. That is, the outer region A13, unlike the transmission region A12, could be called a region where it is alright for dirt to remain. For example, the outer dimensions of the outer region A13 are at least 1 mm larger than the outer dimensions of the transmission region A12. The outer region A13 is provided all the way around the transmission region A12, but may instead be provided to just a part on the outside of the transmission region A12.

Because the exposed region A11 thus has the outer region A13 formed around the peripheral part of the transmission region A12, the transmission region A12 can be cleaned merely by moving any dust or other dirt adhering to the transmission region A12 to the outer region A13, which is not optically effective, which means that the protective sheet 115b is easy to clean.

Also, the opening 390D in a member disposed more to the subject side than the diaphragm 115 (in this embodiment, the shutter unit 390) is set to be larger than a region 119 in which the subject light converted into image data by the CMOS image sensor 110 passes through the shutter unit 390, as viewed from the subject side, so that soiling of the outer region A13 will be easier to move. More specifically, the opening 390D is larger than the region 119 by at least 1 mm to the outside. In the second embodiment, the opening 390D is made larger in all directions with respect to the region 119, but may instead be made larger in just some directions.

Furthermore, four arrows 117 that indicate the boundary between the transmission region A12 and the outer region A13 of the exposed region A11 are provided to the protective sheet 115b of the diaphragm 115. The user can look into the camera body 300 from the body mount ring 151 and wipe away dirt on the diaphragm 115 with a cloth or the like. Seen from the front, the dirt remains near the open region of the shutter unit 190, that is, within a range that is more to the outside than the transmission region A12 as seen from the front. However, the dirt on this portion has little effect on a captured image. Also, providing the arrows 117 makes it easy for the user to tell how much needs to be cleaned. Therefore, the user can reliably clean at least the transmission region A12 by referring to the arrows 117 and moving the dirt from the transmission region A12 to the surrounding outer region A13.

The CMOS image sensor 110 produces image data on the basis of the charge of the various pixels included in a specific region 116. The "subject light converted into image by the CMOS image sensor 110" here refers to the subject light that reaches the specific region 116 out of all the subject light guided from the lens unit 200 to the CMOS image sensor 110.

Other Embodiments

The present invention is not limited to the embodiments given above, and various modifications and changes are possible without departing from the scope of the invention.

(A) In the first and second embodiments above, the shutter unit 190 has the rear curtain 190A and the front curtain 190B, but the shutter unit need not have the front curtain 190B. In this case, the same function as that of the front curtain 190B can be realized by drive control of the CMOS image sensor 110. More specifically, the CMOS image sensor 110 successively resets the pixel charges from the top line. The rear curtain 190A then successively blocks, from the top line, the light going to the CMOS image sensor 110, so that the resetting of the lines tracks the downward movement. The result of this is that charges are accumulated in the pixels during the exposure period from the point of resetting until the incident light is blocked. Here again, the rear curtain 190A can mechanically maintain the open state.

(B) The anti-condensation layer may be a multilayer AR coating or the like, which is resistant to fingerprints.

(C) In the above embodiments, the digital camera 1 has the camera monitor 120 and the EVF 180, but may instead just have either the camera monitor 120 or the EVF 180.

(D) In the above embodiments, an example was given in which the digital camera 1 had the OIS lens 220, but the digital camera may not be equipped with a shake correction function.

(E) The electrical contacts 153 may be supported by the body mount ring 151. For example, the electrical contacts 153 may be provided between the inner and outer peripheries of the body mount ring 151.

(F) The camera body 100 and the digital camera 1 need not be devices for capturing both still pictures and moving pictures, and may instead be devices for capturing only still pictures or only moving pictures.

Components other than those discussed in the features above may be modified or eliminated to obtain the effects discussed in the above features.

INDUSTRIAL APPLICABILITY

The technology disclosed herein can be applied to a camera body to which a lens unit can be mounted, and to an imaging device equipped with this camera body.

REFERENCE SIGNS LIST 1 digital camera (an example of an imaging device)
100, 300 camera body
110 CMOS image sensor (an example of an imaging element)
111 A/D converter
112 timing generator
113 CMOS circuit board
114 optical low-pass filter
115 diaphragm
115b protective sheet
117 mark
120 camera monitor
121 hinge
130 manipulation component
131 release button
132 power switch (an example of a power supply manipulation section)
140 camera controller
141 DRAM
142 main circuit board
145 shutter controller
146 lens detector
150 body mount
151 body mount ring
151a first opening
152 body mount contact support
152a second opening
153 electrical contact
160 power supply
170 card slot
171 memory card (an example of a recording component)
180 electronic viewfinder
181 EVF-use liquid crystal monitor
182 EVF-use optical system
183 eyepiece
190, 390 shutter unit
198 shutter mechanism
199 shutter motor (an example of a shutter driver)
190A rear curtain
190B front curtain
190C shutter support frame
200 lens unit
250 lens mount
253 electrical contact

The invention claimed is:

1. A camera body to which a lens unit configured to form an optical image of a subject is attachable, the camera body comprising:
   a body mount to which the lens unit is attachable;
   an imaging element configured to convert the optical image of the subject into an electrical signal; and
   a shutter unit disposed between the body mount and the imaging element and provided so that an optical path can be blocked between the lens unit and the imaging element, the shutter unit being configured to be in an open state while the lens unit is removed from the body mount.

2. The camera body according to claim 1, wherein the shutter unit is configured to be in the open state before a supply of power to the camera body is halted.

3. The camera body according to claim 1, wherein the body mount includes:
   a body mount ring including a first opening, the body mount ring having an annular shape that allows the lens unit to fit therein; and
   a protective member disposed between the body mount ring and the shutter unit, the protective member including a second opening that has a smaller inner diameter than the first opening.

4. The camera body according to claim 3, further comprising an electrical contact that is held by the protective member.

5. The camera body according to claim 1, further comprising:
   a recording component configured to record the electrical signal; and
   a display component configured to display an image formed by the electrical signal,
   wherein the shutter unit is configured to be in the open state when the camera body is in a reproduction mode that allows the display component to display the image formed by the electrical signal recorded to the recording component.

6. The camera body according to claim 1, further comprising:
   a power supply manipulation section configured to be manipulated to switch on or switch off a supply of power to the camera body,
   wherein the shutter unit is configured to be in the open state when the power supply manipulation section is manipulated to switch off the supply of power.

7. The camera body according to claim 1,
   wherein the shutter unit includes a shutter mechanism and a shutter driver configured to drive the shutter mechanism, the shutter mechanism being configured to put the shutter unit into the open state or a closed state;
   the shutter driver drives the shutter mechanism so as to be in a first state or in a second state, the first state keeping the shutter unit in the open state, and the second state keeping the shutter unit in the closed state.

8. The camera body according to claim 1, further comprising a protective sheet disposed on the optical path between the lens unit and the imaging element, the protective sheet transmitting a light passing through the lens unit.

9. The camera body according to claim 8, wherein the protective sheet includes an exposed region that is exposed outside in a state where the lens unit is removed from the body mount, the exposed region having a surface provided with an antifog layer.

10. The camera body according to claim 9, wherein the antifog layer is formed by photocatalyst.

11. The camera body according to claim 10, wherein the photocatalyst transmits a visible light.

12. The camera body according to claim 1, further comprising
   a display component configured to display an image formed by the electrical signal,
   wherein the shutter unit is configured to be in the open state when the camera body is in a reproduction mode that allows the display component to display the image formed by the electrical signal and when the lens unit is removed from the body mount.

13. The camera body according to claim 1, further comprising
a display component configured to display a setting screen for settings of the camera body,
wherein the shutter unit is configured to be in the open state when the camera body is in a setting mode that allows the display component to display the setting screen and when the lens unit is removed from the body mount.

* * * * *